May 22, 1934.  J. T. LIGGETT  1,959,871
TRACTOR
Filed April 6, 1931  2 Sheets-Sheet 1

INVENTOR
John T. Liggett
BY Brown, Jackson
Boettcher & Diemer
ATTORNEY

WITNESS
Walter Ackerman

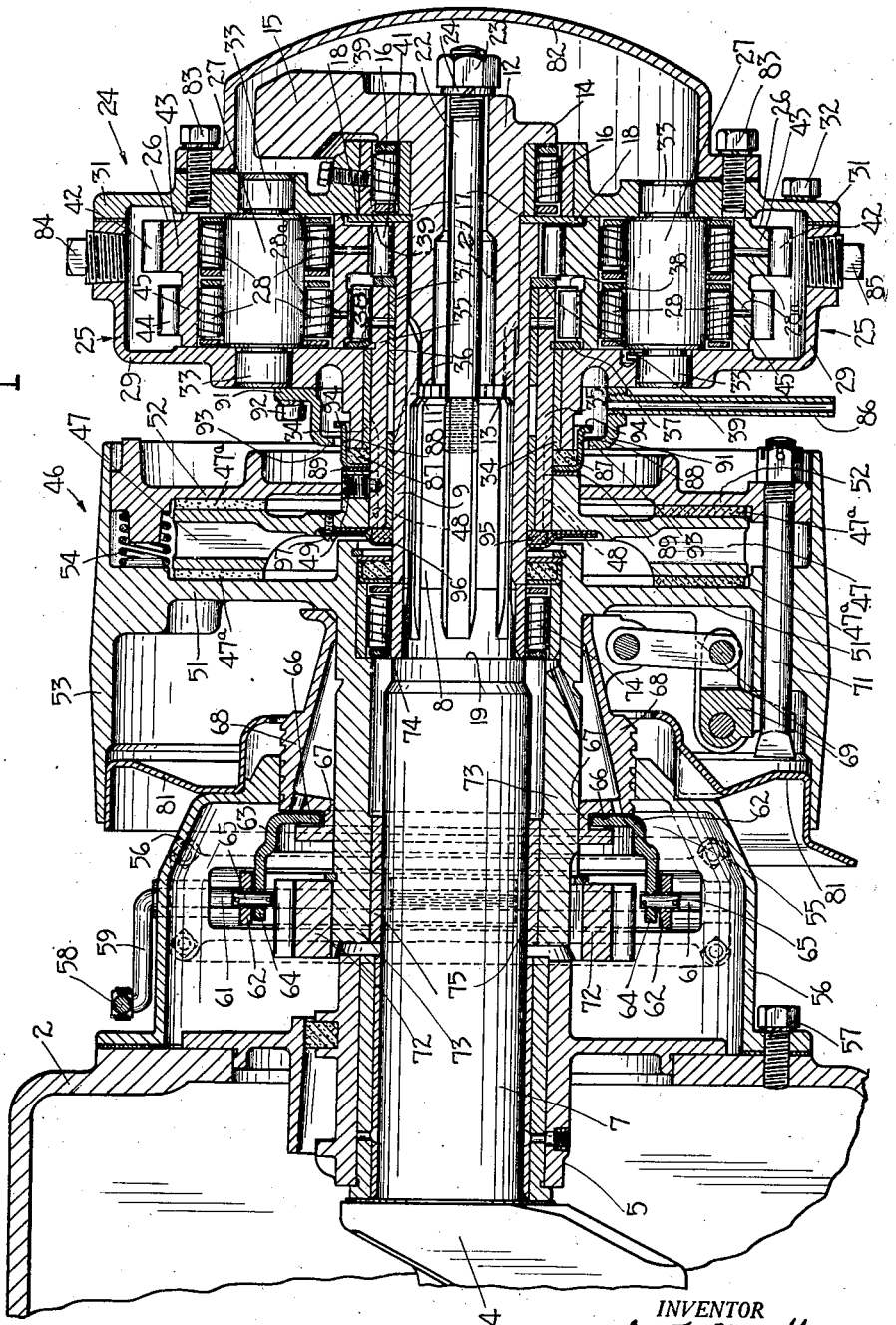

Patented May 22, 1934

1,959,871

UNITED STATES PATENT OFFICE 1,959,871

TRACTOR

John T. Liggett, Waterloo, Iowa, assignor to John Deere Tractor Company, Waterloo, Iowa, a corporation of Iowa Application April 6, 1931, Serial No. 527,925

14 Claims. (Cl. 74—7)

This invention relates to tractors, such as are ordinarily used for farming operations, and is more particularly directed to a new and improved gear reduction transmission means for reducing the speed between the crank shaft of the tractor engine and the drive wheels of the tractor.

Heretofore, it has been found by experience that in certain hilly sections in the wheat country a tractor will stall by reason of the fact that it does not have enough power in low gear to be able to pull uphill certain types of heavy farm machinery, such as a combined harvester and thresher. This very undesirable occurrence from time to time, causes great inconvenience and leads to a considerable loss of time in working a field. By utilizing a gear reduction transmission constructed in accordance with the present invention, all of the speeds of the tractor are reduced, making the low speed of the tractor a somewhat slower speed than the regular low speed of the ordinary type of tractor, which enables the tractor to pull a heavy load under the extreme conditions encountered on farming lands that are located in hilly sections. It is also advantageous to use a tractor which is rendered more powerful by the inclusion of the gear reduction transmission of the present invention whenever the grain is extremely heavy, in order to reduce the speed of the tractor and the implement being towed thereby, such as a combine, to enable the latter to handle the extra heavy stand of grain efficiently.

The main object of the present invention is to provide a gear reduction mechanism by means of which the tractor speeds are somewhat reduced to produce a corresponding increase in the drawbar pull of the tractor.

Another object of the present invention is to incorporate a gear reduction mechanism into a usual type of tractor without necessitating radical and costly changes in the original construction.

Another object is to provide an improved gear reduction mechanism constructed in the form of an attachment which can be easily and quickly installed on a conventional type of tractor. Another more specific object in this regard is to provide such an attachment which can be interposed in the train of driving parts at a point between the engine crank shaft or other driving shaft and a clutch embodied in or associated with the power take-off belt pulley.

A still further object of the present invention is to provide a gear reduction mechanism that can be inspected, cleaned or repaired with facility, such operations requiring but very little time.

Other objects and advantages will hereinafter appear in the following detailed description, reference being had to the accompanying drawings wherein I have illustrated a preferred embodiment of the invention; it being understood, however, that the specific construction and location of this embodiment can be changed without departing from the essence of the invention.

In the drawings:

Figure 2 is a vertical axial cross sectional view through the power transmission mechanism and gear reduction transmission, as taken substantially along line 2—2 of Figure 1.

Figure 1:
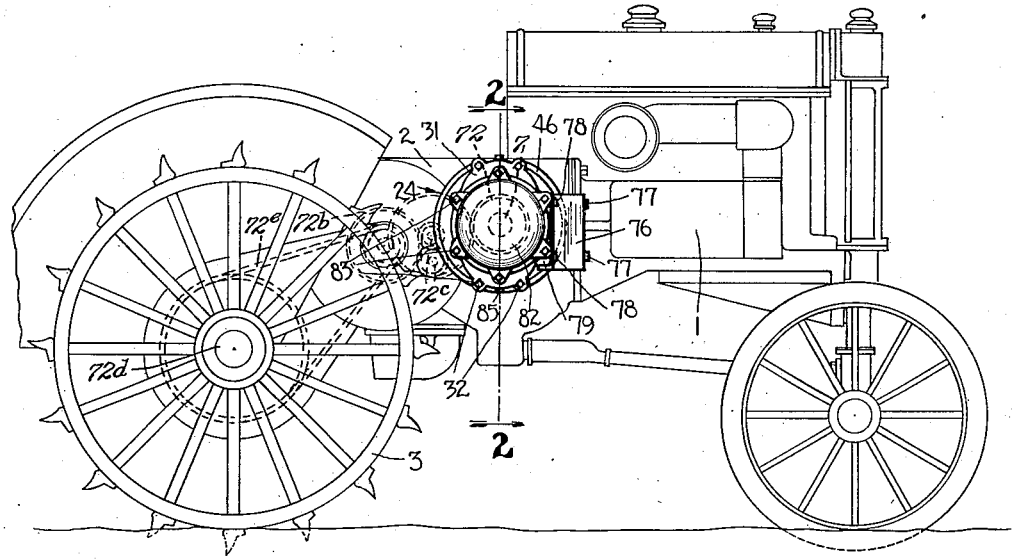
Figure 1 is a diagrammatical side elevational view of a tractor embodying the gear reduction transmission comprising the present invention.

Referring to Figure 1, the exemplary form of tractor shown comprises an engine having horizontal cylinders 1 which are bolted to the front end of a transmission housing 2 in which is enclosed the ordinary selective speed and reversing gear mechanism for transmitting a drive to the traction wheels 3. The crank shaft 4 of the engine extends transversely of the housing 2, and supports a power control clutch and belt pulley on one end. The present invention has ready adaptability to this type of tractor but the essential features thereof can also be adapted to other types of tractors.

Referring now to Figure 2, the crank shaft 4 has one end thereof rotatably mounted in a suitable bearing 5 secured to the transmission housing 2. The journal section 7 of the crank shaft projects outwardly from the housing through the bearing and is provided with a splined end 8 of smaller diameter than the journal portion. A sleeve 9 is carried by the splined end of the crank shaft so as to project outwardly therefrom, and is provided with internal splines 11 which engage the splines of the shaft for causing constant rotation of the sleeve with the crank shaft. An auxiliary stub shaft 12 is disposed axially of the journal section of the crank shaft and within the projecting end of the sleeve 9, the stub shaft extending outwardly from said sleeve. The inner end of the stub shaft is provided with splines 13 which mesh with the internal splines 11 of the sleeve, so that stub shaft 12 is constantly driven by the crank shaft through the instrumentality of sleeve 9. Sleeve 9 constitutes the central rotating member of the present construction which transmits the driving power of the crank shaft directly to the improved speed reduction mechanism. The outer end of this sleeve is amply supported by the stub shaft for true rotation on the crank shaft axis, by reason of the connection of the stub shaft with the crank shaft, as will appear in the following description.

The auxiliary stub shaft 12 is provided with a flange 14 at its outer end, having a counterweight 15 extending outwardly from the flange to compensate for the additional mechanism mounted on the crank shaft and to maintain the latter in proper static and dynamic balance. Flange 14 is adapted to abut the inner raceway of an antifriction bearing 16. A shoulder 17 is provided on member 12 and located in peripheral alignment with the inner end of the antifriction bearing 16. This shoulder and the raceways of bearing 16 abut a retaining ring 18. Ring 18 is adapted to bear against the outer end of sleeve 9, the inner end of said sleeve abutting the end of the inner raceway of bearing 74, the latter in turn abutting shoulder 19 on the crank shaft. Stub shaft 12 is further provided with an internal bore 21, and a stud 22, threaded into the splined end 8 of the crank shaft, extends through the internal bore of shaft 12 and projects outwardly beyond the outer end thereof. A nut 23 is screwed on to the projecting end of stud 22 and tightened against the face of stub shaft 12, the nut being held against loosening by means of a spring washer 24. In tightening up the nut 23 the sleeve 9 and stub shaft 12 are rigidly secured to the crank shaft 4, since sleeve 9 abuts the raceway of bearing 74 which abuts shoulder 19 on the crank shaft, and because ring 18 is forced against the outer end of the sleeve by means of the inner race of bearing 16 or by the shoulder 17 formed on stub shaft 12 as hereinbefore described.

By this particular construction, all of the elements of the mechanism comprising the present invention are supported on the end of the crank shaft, and retained in operative engagement therewith by means of nut 23. This manner of holding the various elements of the present construction upon the crank shaft, permits the assembling and disassembling of such elements to be performed quickly and with facility.

The speed reduction mechanism, indicated at 24 in its entirety, is supported partly on the end of the crank shaft and partly on the stub shaft 12 carried by the former. This mechanism comprises a housing 25 supporting double gears 26 on axes spaced radially from the longitudinal center line of the crank shaft but extending parallel to the crank shaft axis. Preferably, a plurality of these double gears 26 are provided at angularly spaced points around the center of the mechanism to provide a balanced construction wherein radial driving loads on the sleeve 9 are balanced at opposite sides, the embodiment shown having two of these double gears in diametrically opposite relation. Gears 26 are rotatably mounted on shafts 27 by means of the antifriction roller bearings 28. Housing 25 is constructed in two sections 29 and 31, respectively, secured together by any suitable means such as bolts 32. Shafts 27 are provided with spindles 33 of reduced diameter, which are mounted in aligned openings contained in the two sections of the housing.

Housing 25 is supported on the crank shaft and by the auxiliary shaft of the latter in the following manner: Outer section 31 of the housing is supported on the antifriction roller bearing 16, adjacent to the outer end of stub shaft 12. The inner section 29 of the housing is provided with a bushing 34 which is adapted to revolve on a sleeve 35 mounted on bearing bushings 36 rotatably supported on sleeve 9. Housing 25 is prevented from moving inwardly along the crank shaft by means of the retaining ring 18 since the latter is held between the end of sleeve 9 and shoulder 17 of the stub shaft 12. The housing is prevented from moving outwardly by means of a thrust collar 37 bearing against teeth 38 carried on the outer periphery of sleeve 35 and at the outer end thereof. Axial movement of collar 37 is prevented by sleeve 35, since the latter engages a thrust collar 39 that is held in place by means of the radially projecting gear teeth 41 on the sleeve 9.

The speed reduction mechanism is driven directly from the crank shaft through sleeve 9 by means of the external gear teeth 41 carried at the outer end of that sleeve. Teeth 41 mesh with teeth 42 on the larger gear section 43 of the double gear 26. Driving power is then transmitted from teeth 44 constituting the smaller gear section 45 of the double gear 26, to the teeth 38 on sleeve 35. Power may then be transmitted from sleeve 35 to the driving element of any suitable clutch such as indicated at 46. In the particular clutch utilized in the present construction, a clutch driving element, in the form of a double faced disc as indicated at 47, is supported on the inner end of sleeve 35 and splined thereto at 48 to constantly rotate therewith. Endwise movement of disc 47 longitudinally of sleeve 35 is prevented by any suitable means such as a set screw 49. The two faces of disc 47 are provided with suitable frictional facing 47a, and the disc is confined between two friction plates 51 and 52, the former plate constituting the web portion of a power take-off pulley wheel 53, such as is commonly utilized for transmitting a belt drive to various types of farm machinery. Plates 51 and 52 are normally forced apart by spring such as 54, so that disc 47 is free to rotate without transmitting power to the friction plates.

The transmission of power through the clutch to the main driving pinion of the tractor will more readily be understood by a brief description of the operation of the cluch 46. In this particular type of clutch, plates 51 and 52 are adapted to have frictional engagement with the rotating disc 47 by means of the clutch controlling mechanism 55, the latter being housed within an auxiliary casing 56 secured to the main transmission housing 2 by means of bolts 57. Control mechanism 55 comprises a pull rod 58 pivotally connected with the crank arm 59 of spindle 61, the latter being pivotally supported by the casing 56. A shift fork 62 is secured to spindle 61 for swinging therewith. A flanged collar 63 is pivotally connected by means of extended ears 64 to the free ends of the fork at 65, with the flange 66 of said collar engaging within a groove 67 formed in the periphery of slidable sleeve 68. When pull rod 58 is operated, sleeve 68 forces plate 51 against one face of the driving disc 47. At the same time a link mechanism 69, which is operatively connected with sleeve 68, causes plate 52 to be drawn against the opposite face of the driving disc by means of a tie bolt 71. It is usual practice to provide a number of mechanisms such as 69, there being three in the present clutch construction, only one of which is visible. The drive through the clutch is transmitted to the driving pinion 72 by means of a sleeve 73 forming the extended hub portion of pulley 53. One end of sleeve 73 is rotatably supported on the crank shaft by means of an anti-friction bearing 74. The other end of sleeve 73 is provided with a bushing 75 supported directly on the journal end of the crank shaft. The main driving pinion 72 is keyed or otherwise suitably secured to the outer end of sleeve 73 to constantly rotate therewith when the sleeve is being driven. Pinion 72 is adapted to drive the tractor through any suitable train of mechanism, and in this instance, pinion 72 meshes with a gear 72a which drives a gear 72b through suitable speed reduction means 72c, and the drive from gear 72b is completed to the rear axle member 72d by any desirable mechanism such as the chain and gear means 72e. The operation of the above described speed reduction mechanism for driving the main driving pinion through the clutch from the crank shaft, and at a slower angular velocity than the angular velocity of the crank shaft will hereinafter be referred to.

Figure 3:
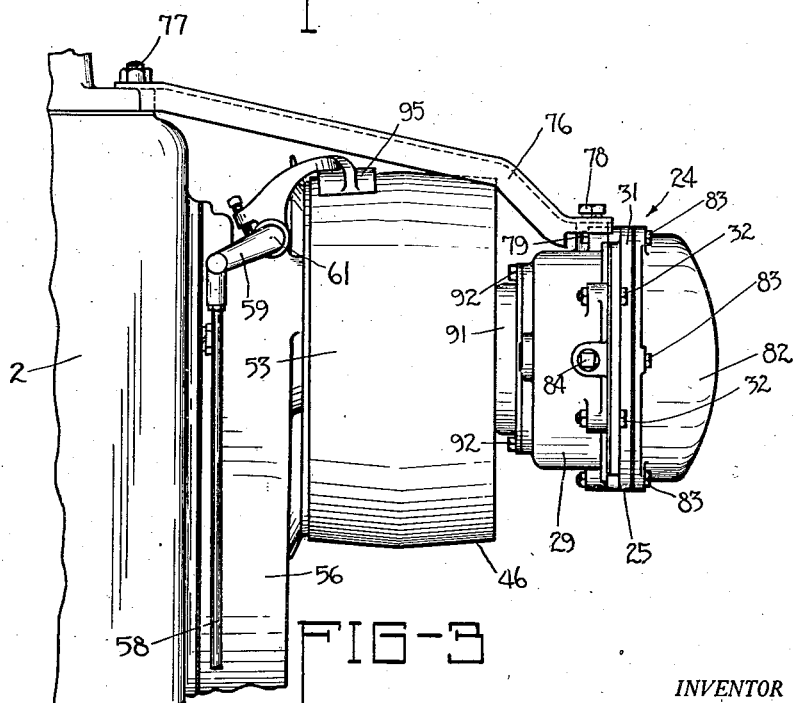
Figure 3 is a plan elevational view of a portion of the tractor, the power transmission mechanism and the gear reduction transmission illustrated in Figure 2.

In order to prevent rotation of housing 25 when driving from the crank shaft through said speed reduction mechanism, a bracket or brace such as 76 may be provided, see Figures 1 and 3. Preferably, bracket 76 is formed of channel iron to obtain the desired rigidity. This bracket is firmly secured to the tractor by any desirable means such as bolts 77, with its outwardly extending end fastened by means of bolts 78 to a suitable boss 79 which projects outwardly from section 29 of the housing. It is apparent that there are different ways of preventing rotation of housing 25, and when using a bracket such as 76, it is obvious that the same may be located in any number of positions on the tractor. However, in the present construction, bracket 76 has been devised to serve a two-fold purpose, and the location in which it is illustrated is desirable. One purpose is that of preventing rotation of the housing as above described. The second purpose is to provide a bracket of such strength as will hold the housing against turning, and in addition thereto, one which will act as a support to relieve the projecting end of the crank shaft of the added weight of the attached speed reduction mechanism as well as the weight of the balance of the mechanisms carried by said shaft. When the tractor is traveling over undulations in the ground, sudden jolts will cause the projecting end of the crank shaft to be subjected to bending stresses, which are set up therein by the overhanging weight of the mechanism. By utilizing a bracket such as 76, and connecting the same between the tractor and housing 25, practically all or a greater portion of the bending stresses in the crank shaft are absorbed by the bracket. The bracket itself is disposed with its greater width in a vertical plane so as to have its strongest section modulus counteracting the bending stresses set up therein by the weight of the mechanisms carried on the outwardly projecting end of the crank shaft.

Another important factor in a device of the present construction is to provide adequate lubrication and also to prevent infiltration of foreign materials such as dust, grit, sand, etc., into such a device. The clutch and its associated mechanisms, and the journal end of the crank shaft may be lubricated in any well known manner. A dust shield such as 81 encloses the open side of the clutch to prevent infiltration of foreign materials into the clutch mechanism. The speed reduction mechanism is preferably lubricated as follows: A cap 82 is secured by bolts 83 to the outer face of section 31 of the housing, and acts as an oil reservoir and as a guard for the exposed parts of the speed reduction mechanism, principally for the revolving counterweight 15. Section 29 of the housing is provided with the removable plugs 84 and 85, the former plugging the filler opening and the latter plugging the drain opening. The lower double gear and its associated mechanisms revolve in a bath of oil or grease (not shown) the level of which is determined by a hole (not shown) in the side of the housing 25 closed by a pipe plug when in service. The upper double gear and its bearings are lubricated by oil carried up by teeth 38 and 41 on sleeves 35 and 9. The bearings 28 are lubricated by oil forced through holes 28a between the teeth 42 and 44 in gears 43 and 45 by the meshing of the teeth as the gears revolve. The outer bushings 36 which are secured inside of sleeve 35 are lubricated in the same manner by oil forced through holes between the gear teeth 38. The balance of the revolving parts, such as sleeves 9 and 35, etc., will be sufficiently lubricated by the oil that drains from the double gears, roller bearings, etc. A drain pipe 86 is provided to drain off whatever oil is collected within the enclosure formed between shield 93 and housing section 29.

The infiltration of foreign materials into the mechanism is limited to two points since the joints between housing sections 29 and 31, and between section 31 and cap 82 are sealed with gaskets. The entry of foreign material between sleeve 35 and housing section 29 is prevented by means of shield 93 attached to housing 29 at 91 by means of bolts 92, a revolving slinger 88 which is attached to clutch driving disk 47 by means of screws which are not shown, and a packing 87 inside of the revolving member 88 which bears on the inner hub end of housing section 29, and seals the mechanism against the entry of foreign material at this point. The entry of foreign material between sleeve 35 and sleeve 9 is prevented by a packing 95 in contact with sleeve 9 and held in place by cover plate 96, attached by screws 97 to the hub portion of driving disk 47. The clutch parts outside of this constitute a reasonable effective enclosure and prevent any large quantity of dirt reaching this vicinity. By sufficiently lubricating the elements of the speed reduction mechanism and preventing the infiltration of dust and other foreign materials into this mechanism, wear is greatly reduced and the period of normal usefulness of the device is greatly increased.

Tractors utilizing the speed reduction device constructed in accordance with the present invention are rendered more powerful than those tractors incorporating the ordinary driving transmission construction, wherein the main driving pinion such as 72 is driven directly by the crank shaft through the clutch. This is evidenced from the fact that all of the tractor speeds are reduced with the corresponding gain in mechanical advantage obtained through the gear reduction accomplished by means of the double gears 26. Gears 26 establish a double reduction in speed between sleeve 9 and sleeve 35. One speed reduction takes place between sleeve 9 and gear section 43 by reason of the gear ratio of teeth 41 to teeth 42, the pitch diameter of the former being smaller than the pitch diameter of the latter. The second speed reduction is accomplished between gear section 45 and sleeve 35 by reason of the gear ratio of teeth 44 to teeth 38, and in this case the pitch diameter of the former is smaller than the pitch diameter of the latter. Although the foregoing combination of gear ratios is preferable, it is readily possible to vary these gear ratios as may be desired for different operating conditions.

The operation of a tractor embodying the speed reduction mechanism is as follows: When the tractor is at a standstill, with the engine idling, the crank shaft will be driving the double gear 26 through teeth 41 on sleeve 9, with the gears transmitting driving power through the teeth 38 on sleeve 35 to the driving disc 47 of the clutch. At this time the clutch plates 51 and 52 will be disengaged. When the tractor is to be set into motion, the operator actuates pull rod 58 to cause the engagement of the clutch plates 51 and 52 with the driving disc 47 whereupon the foregoing elements will be in the position shown in Figure 2. Power will then be transmitted through the clutch to the main driving pinion 72 by means of sleeve 73. The tractor will continue in motion until the clutch is again disengaged. A suitable type of brake is also provided to operate concurrently with the engagement and disengagement of the clutch. The brake comprises a brake shoe 95 connected with spindle 61 (see Figure 3), which is adapted to engage the outer surface of pulley 53 when the clutch is disengaged. When operating pull rod 58 to cause engagement of the clutch, the brake shoe 95 is automatically released from the surface of the pulley to allow rotation of the latter.

The foregoing description has been confined to the disclosure illustrated in the drawings. Although this construction is a preferred embodiment of the device, it is to be understood that the same may be varied and may be applied to other types of tractors without departing from the scope of the invention. Therefore, it is to be understood that I do not wish to be limited strictly thereto but only insofar as is set forth in the claims appended hereto.

What I claim is:

1. In combination with a tractor engine crank shaft, a clutch mounted upon said crank shaft to rotate independently thereof, a driving pinion connected with said clutch for driving said tractor, and a speed reduction transmission comprising a toothed sleeve operatively connected with the crank shaft to rotate therewith, speed reduction gears adapted to be driven by said toothed sleeve, housing means supported by said crank shaft for supporting said gears, clutch driving means operatively connected with said gears to be driven thereby, and means extending between the tractor and said housing means to prevent the latter from rotating with said crank shaft.

2. In a tractor, the combination of an engine crank shaft, a clutch mounted upon said crank shaft to rotate independently thereof, a driving pinion connected with said clutch and adapted for driving the tractor, and a speed reduction transmission comprising a toothed sleeve operatively connected with said crank shaft to rotate therewith, speed reduction gears adapted to be driven by said toothed sleeve, housing means supported by said crank shaft for supporting said gears, clutch driving means operatively connected with said gears to be driven thereby, and a bracket fixedly secured to the tractor and fastened to said housing to prevent the latter from rotating with said crank shaft, and to support the weight of the transmission elements for relieving said crank shaft from excessive bending stresses.

3. In a tractor, the combination of an engine crank shaft, a clutch mounted upon said crank shaft to rotate independently thereof, a driving pinion connected with said clutch and adapted for driving the tractor, and a speed reduction transmission comprising a toothed sleeve operatively connected with the crank shaft and extending outwardly therefrom, a housing freely carried on said sleeve, speed reduction gears pivotally supported in said housing and meshing with the teeth on said sleeve, a second toothed sleeve rotatably mounted on said first sleeve and adapted to be driven by said gears, said second sleeve being connectible with said clutch to drive the same, and means connected between the tractor and said housing for supporting the weight of the transmission elements and to prevent said housing from rotating with said crank shaft.

4. In combination with a tractor engine crank shaft, a clutch mounted upon said crank shaft to rotate independently thereof, a driving pinion connected with said clutch for driving said tractor, and a speed reduction transmission comprising a toothed sleeve operatively connected with the crank shaft and extending outwardly therefrom, a housing freely carried on said sleeve, means for preventing rotation of said housing with said sleeve, speed reduction gears pivotally supported in said housing and meshing with the teeth on said sleeve, a second toothed sleeve rotatably mounted on said first sleeve and adapted to be driven by said gears, said second sleeve being connectible with said clutch to drive the same.

5. In combination with a tractor engine crank shaft, a clutch mounted upon said crank shaft to rotate independently thereof, a driving pinion connected with said clutch for driving said tractor, and a speed reduction transmission comprising a first toothed sleeve secured to the crank shaft in coaxial relation and rotating therewith, a second toothed sleeve mounted for rotation upon said first sleeve and connectible with said clutch, and double gears meshing with the teeth on said sleeves for operatively connecting the aforesaid sleeves, said double gears having one gear section meshing with the teeth of said first sleeve to obtain a first speed reduction, and having a second gear section meshing with the teeth of said second sleeve to obtain a second speed reduction.

6. In a tractor, a clutch adapted to be mounted on the crank shaft of the tractor engine for rotation independently thereof, a driving pinion connected with said clutch for driving said tractor, a casing adapted to be freely supported on said crank shaft, and a speed reduction mechanism carried by said casing and connected with said shaft and adapted to be operatively driven therefrom, said speed reduction means being connected with said clutch to drive said pinion at a slower angular velocity than the angular velocity of the crank shaft when said clutch is engaged, and supporting means adapted to extend between said tractor and said casing independently of said crank shaft to support the weight of the casing and the speed reduction mechanism and to prevent said casing from turning on said shaft.

7. In a tractor, a clutch adapted to be mounted on the crank shaft of the tractor engine for rotation independently thereof, a driving pinion connected with said clutch for driving said tractor, and power transmission means adapted to be operatively driven by said crank shaft and connected with said clutch comprising, a toothed sleeve adapted to be operatively connected with said crank shaft to rotate therewith, speed reduction gears driven by said toothed sleeve, housing means adapted to be supported on said crank shaft for supporting said gears, means for preventing rotation of said housing when said crank shaft rotates, and clutch driving means operatively connected with said gears and driven thereby.

8. The combination with an engine driven tractor having a casing for housing the tractor transmission, said engine having a crank shaft disposed within said casing with one end of said shaft projecting therethrough, of a tractor driving pinion journaled on said crank shaft and connected to drive the tractor, and gear means supported exteriorly of the casing upon the projecting end of said crank shaft and connecting said shaft with said driving pinion to drive the latter at a different angular velocity than the angular velocity of the crank shaft.

9. The combination with a tractor having an engine with a crank shaft disposed transversely of said tractor and including a housing for said shaft, said shaft extending through said housing and projecting laterally outwardly therefrom, of a driving member adapted to be connected for driving said tractor, a power take-off pulley, and attachment means supported upon the projecting end of said crank shaft and including speed changing gearing, said gearing comprising means for operatively connecting said shaft with said driving member and pulley to drive the latter elements at a different angular velocity than the angular velocity of the crank shaft.

10. The combination with a tractor having an engine with a crank shaft disposed transversely of said tractor and including a housing for said shaft, said shaft extending through said housing and projecting laterally outwardly therefrom, of a tractor driving member loosely journaled upon said shaft intermediate the extended end thereof, attachment means having a casing supported upon the outer end of said crank shaft and including speed changing gearing therein, said gearing comprising means projecting through said casing for operatively connecting said shaft with said driving member to drive the latter at a different angular velocity than the angular velocity of the crank shaft, and means for interrupting the drive from said crank shaft to said driving member.

11. A speed changing transmission associated with the engine crank shaft of a tractor and adapted for intermittently driving said tractor, comprising a clutch mounted on said crank shaft to rotate independently thereof, a driving pinion connected with said clutch for driving said tractor, a toothed sleeve operatively connected with the crank shaft to rotate therewith, gears adapted to be driven by said toothed sleeve, housing means supported by said crank shaft for supporting said gears, clutch driving means operatively connected with said gears to be driven thereby, and means adapted to extend between said tractor and said housing means to prevent the latter from moving with said crank shaft.

12. The combination with a tractor having a main housing, of a drive shaft journaled in the housing and projecting externally therefrom, an attachment comprising a second housing, a driven sleeve journaled in said second housing and projecting externally therefrom, a drive member also journaled in the second housing and disposed within said sleeve, means for rigidly connecting the drive member with the drive shaft, means disposed within the second housing for connecting the drive member with the sleeve whereby the latter is rotated at a speed different from the speed of rotation of said drive member, a tractor driving member disposed within said main housing, means connectible between said sleeve and said tractor driving member for transmitting power to the latter from said sleeve, and means for rigidly connecting the two housings to prevent relative rotation thereof.

13. A speed changing transmission for an implement having a drive shaft, a clutch adapted to be mounted on said shaft to rotate independently thereof, and a pinion connected with said clutch and adapted for taking power therefrom, said transmission comprising a toothed sleeve adapted to be operatively connected with said shaft and extend outwardly therefrom, a housing freely carried on said sleeve, gears pivotally supported by said housing and meshing with the teeth on said sleeve, a second toothed sleeve rotatably mounted on the first sleeve and adapted to be driven by said gears, said second sleeve being adapted to be connected with said clutch to drive the same, and means adapted to be connected between said implement and said housing for supporting the weight of the transmission elements and to prevent said housing from moving with said shaft.

14. The combination with a tractor having a housing, of a drive shaft journaled in said housing and having one end thereof projecting therethrough, gear reduction mechanism mounted upon said drive shaft outside of said housing, sleeve means journaled upon said drive shaft and operatively connected with said gear reduction mechanism to be driven thereby and extending into said housing, and a tractor driving pinion secured to the inner end of said sleeve.

JOHN T. LIGGETT.